(12) United States Patent
Heasley et al.

(10) Patent No.: US 12,194,972 B2
(45) Date of Patent: Jan. 14, 2025

(54) VEHICLE BRAKING SYSTEM

(71) Applicant: Robert Bosch GmbH, Stuttgart (DE)

(72) Inventors: F. Douglas Heasley, Farmington, MI (US); Bhaskar Ray, Northville, MI (US); Julian Staack, Ilsfeld (DE); Patrick Lellmann, Oedheim (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 17/709,870

(22) Filed: Mar. 31, 2022

(65) Prior Publication Data

US 2023/0311837 A1 Oct. 5, 2023

(51) Int. Cl.
| | |
|---|---|
| *B60T 8/36* | (2006.01) |
| *B60T 8/40* | (2006.01) |
| *B60T 11/224* | (2006.01) |
| *B60T 13/68* | (2006.01) |
| *B60T 13/74* | (2006.01) |

(52) U.S. Cl.
CPC .......... *B60T 13/745* (2013.01); *B60T 8/4081* (2013.01); *B60T 11/224* (2013.01); *B60T 13/686* (2013.01)

(58) Field of Classification Search
CPC .... B60T 13/686; B60T 11/224; B60T 8/4081; B60T 13/745
See application file for complete search history.

(56) References Cited

U.S. PATENT DOCUMENTS

| | | | | |
|---|---|---|---|---|
| 4,530,209 | A | * | 7/1985 | Steffes ................. B60T 13/146 60/563 |
| 5,261,730 | A | * | 11/1993 | Steiner .................... B60T 8/175 303/115.4 |
| 6,033,035 | A | | 3/2000 | Neumann et al. |
| 6,354,673 | B1 | | 3/2002 | Feigel et al. |
| 6,604,795 | B2 | | 8/2003 | Isono et al. |
| 6,733,090 | B2 | | 5/2004 | Pasterkamp et al. |
| 6,851,764 | B2 | | 2/2005 | Giers et al. |
| 8,544,962 | B2 | | 10/2013 | Ganzel |
| RE44,677 | E | | 12/2013 | Campau et al. |
| 9,964,128 | B2 | | 5/2018 | Kistner |

(Continued)

FOREIGN PATENT DOCUMENTS

| | | |
|---|---|---|
| CN | 106274869 A | 1/2017 |
| CN | 110155014 A | 8/2019 |
| DE | 102020202716 A1 | 9/2021 |

*Primary Examiner* — Nicholas J Lane
(74) *Attorney, Agent, or Firm* — Michael Best & Friedrich LLP (57) ABSTRACT

A vehicle braking system includes a master cylinder having a pedal feel simulator incorporated therein, a reservoir configured to retain a volume of unpressurized brake fluid for use in the vehicle braking system, a wheel cylinder coupled to the master cylinder via a first braking circuit, an electronically-controlled pressure generating unit configured to move fluid through the first braking circuit to the wheel cylinder in a first mode of operation, and a two-way valve positioned in the first braking circuit and configured to selectively decouple the master cylinder from the wheel cylinder. In the first mode of operation, the master cylinder is decoupled from the wheel cylinder via the two-way valve and the master cylinder is coupled to the reservoir via the two-way valve. In a second mode of operation, the master cylinder is coupled to the wheel cylinder via the two-way valve.

18 Claims, 6 Drawing Sheets

(56) References Cited

U.S. PATENT DOCUMENTS

| | | | |
|---|---|---|---|
| 10,059,321 B2 | 8/2018 | van Zanten et al. | |
| 2003/0234574 A1 | 12/2003 | Reuter et al. | |
| 2006/0202551 A1* | 9/2006 | Gottwick | B60T 8/4081 |
| | | | 303/116.1 |
| 2011/0185723 A1* | 8/2011 | Ganzel | B60T 7/042 |
| | | | 60/547.1 |
| 2014/0131154 A1* | 5/2014 | Ganzel | B60T 13/588 |
| | | | 303/14 |
| 2014/0345272 A1* | 11/2014 | Kistner | B60T 13/146 |
| | | | 60/537 |
| 2016/0046272 A1 | 2/2016 | Masur et al. | |
| 2019/0329751 A1* | 10/2019 | Jeong | B60T 11/20 |
| 2022/0274572 A1* | 9/2022 | Ganzel | B60T 13/745 |
| 2024/0190405 A1* | 6/2024 | Leiber | B60T 8/92 |

\* cited by examiner

VEHICLE BRAKING SYSTEM

BACKGROUND

Vehicle braking systems convert a braking input, such as a manual input at a brake pedal or an automatic input based on a sensor identifying a condition necessitating braking, into a braking output at one or more wheel cylinders. In brake-by-wire braking operations, the user is decoupled from the braking output at the wheel cylinders. Manual input at the brake pedal in brake-by-wire braking operations may be met by feedback from a pedal feel simulator that, in some operations, is proportional to the force applied at the wheel cylinders.

SUMMARY

The present disclosure relates to a vehicle braking system. The vehicle braking system includes a master cylinder having a pedal feel simulator incorporated therein, a reservoir configured to retain a volume of unpressurized brake fluid for use in the vehicle braking system, a wheel cylinder coupled to the master cylinder via a first braking circuit, an electronically-controlled pressure generating unit configured to move fluid through the first braking circuit to the wheel cylinder in a first mode of operation, and a two-way valve positioned in the first braking circuit and configured to selectively decouple the master cylinder from the wheel cylinder. In the first mode of operation, the master cylinder is decoupled from the wheel cylinder via the two-way valve and the master cylinder is coupled to the reservoir via the two-way valve. In a second mode of operation, the master cylinder is coupled to the wheel cylinder via the two-way valve.

The present disclosure relates further to a vehicle braking system. The vehicle braking system includes a master cylinder having a first master cylinder chamber and a second master cylinder chamber and a pedal feel simulator incorporated therein, a reservoir configured to retain a volume of unpressurized brake fluid for use in the vehicle braking system, a first wheel cylinder coupled to the first master cylinder chamber via a first braking circuit, a second wheel cylinder coupled to the second master cylinder chamber via a second braking circuit, an electronically-controlled pressure generating unit configured to move fluid through the first braking circuit and the second braking circuit to the first and second wheel cylinders in a first mode of operation, a first two-way valve positioned in the first braking circuit and configured to selectively decouple the master cylinder from the first wheel cylinder, and a second two-way valve positioned in the second braking circuit and configured to selectively decouple the master cylinder from the second wheel cylinder. In the first mode of operation, the first and second two-way valves decouple the first and second master cylinder chambers from the first and second wheel cylinders, respectively, and couple the first and second master cylinder chambers to the reservoir. In a second mode of operation, the first and second two-way valves couple the first and second master cylinder chambers to the first and second wheel cylinders, respectively.

The present disclosure further relates to a vehicle braking system. The vehicle braking system includes a brake pedal coupled to an input rod, a pedal feel simulator having a piston coupled directly to input rod and configured to provide feedback to an operator of the brake pedal, a reservoir configured to retain a volume of unpressurized brake fluid for use in the vehicle braking system, a wheel cylinder coupled to the pedal feel cylinder via a first braking circuit, a switching valve located within the first braking circuit, wherein, in a first position, the switching valve couples the pedal feel simulator to the reservoir, and in a second position, the switching valve couples the pedal feel simulator to the wheel cylinder, and an electronically-controlled pressure generating unit configured to move fluid through the first braking circuit to the wheel cylinder in a first mode of operation. In the first mode of operation, the switching valve is in the first position. In a second mode of operation in which the electronically-controlled pressure generating unit is inoperable to move fluid through the first braking circuit, the switching valve is in a second position.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include hydraulic or electrical connections or couplings, whether direct or indirect.

Figure 1:
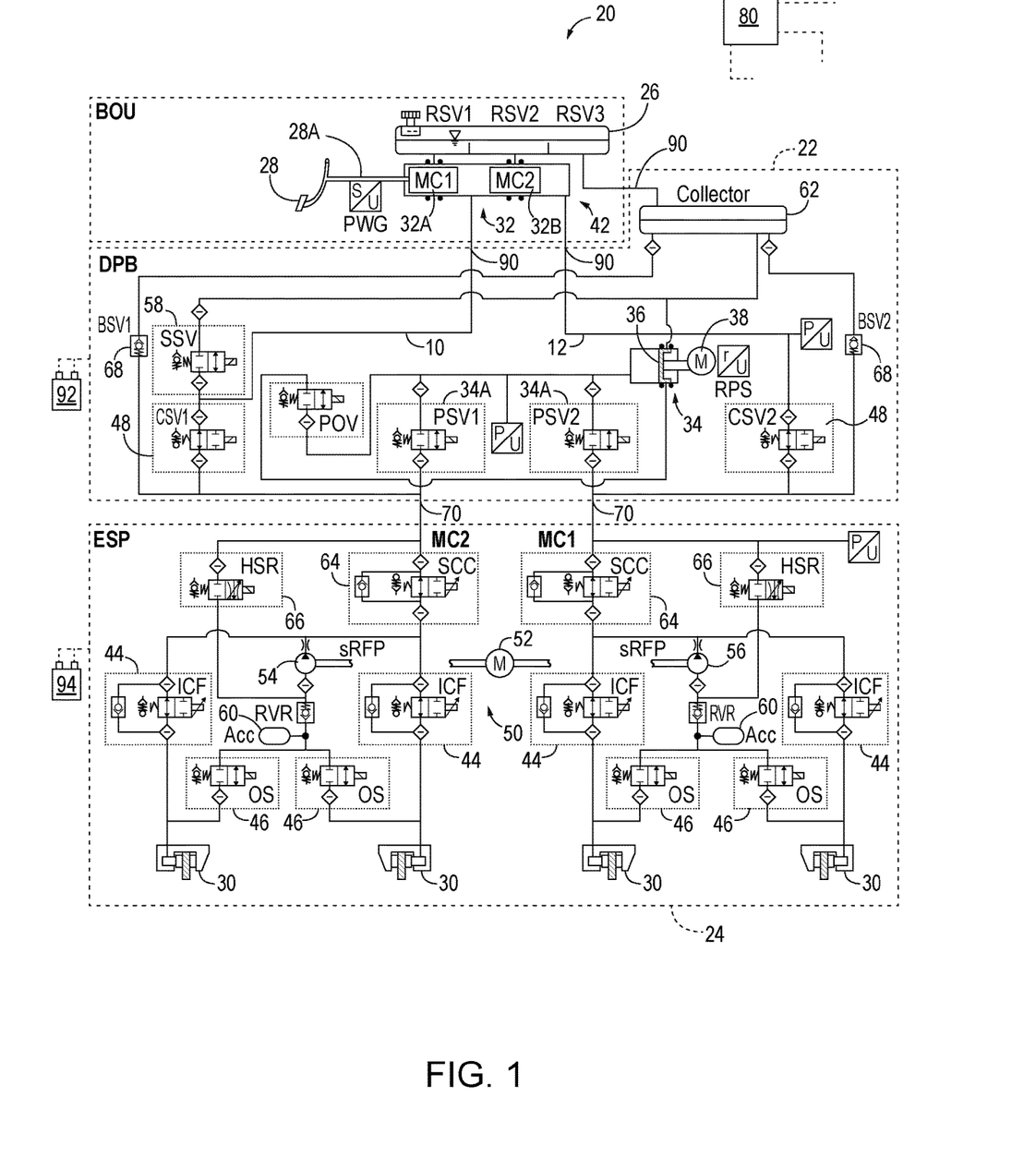
FIG. 1 is a schematic diagram of a brake system having an integrated pedal feel simulator according to a first embodiment.
Figure 6:
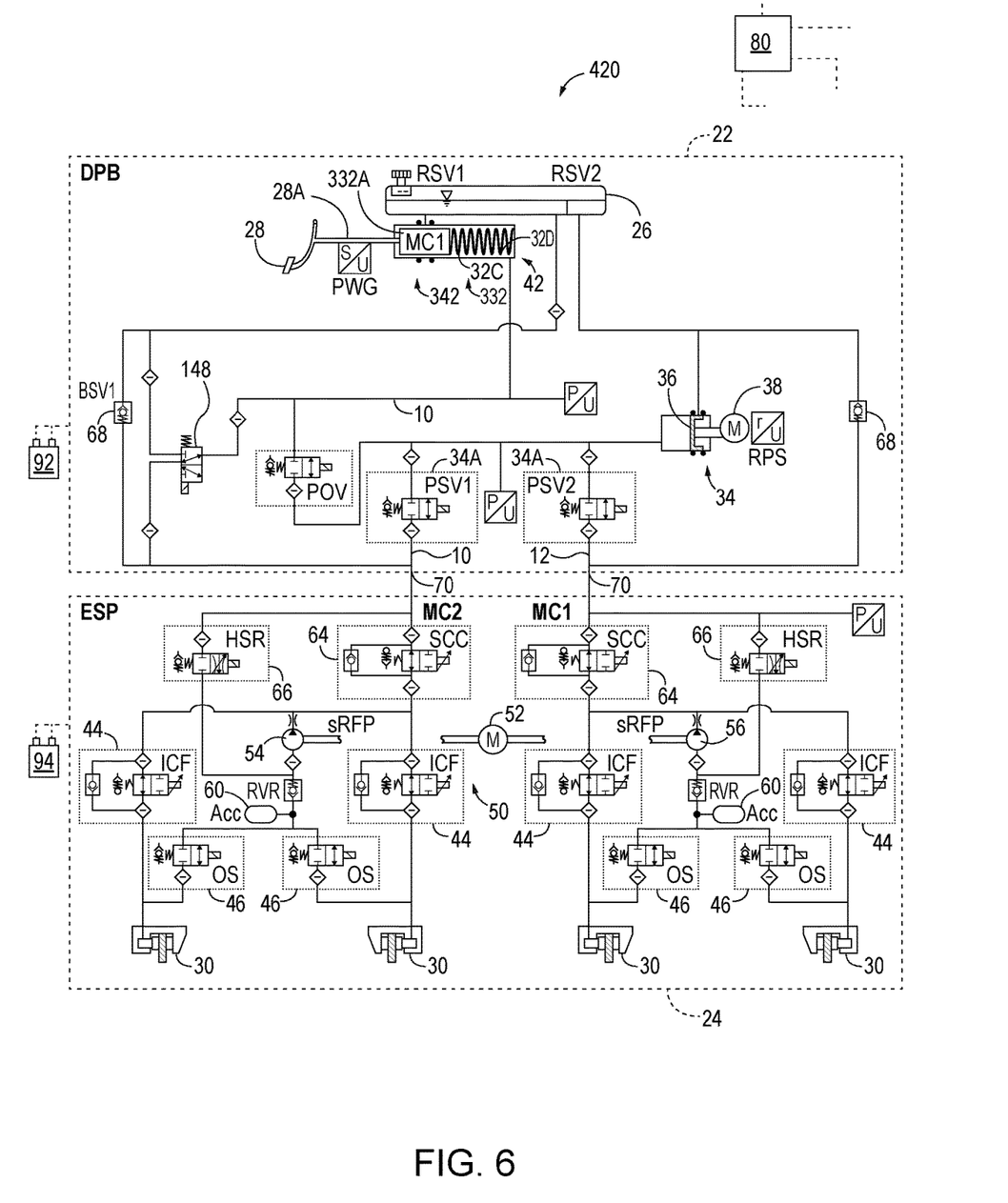
FIG. 6 is a schematic diagram of a brake system having an integrated pedal feel simulator according to a fifth embodiment.

FIG. 1 illustrates a vehicle braking system 20. The vehicle braking system 20 is a brake-by-wire braking system including a primary braking unit 22, a secondary braking unit 24, a fluid reservoir 26, a brake pedal 28, and a plurality of wheel cylinders 30 (as shown, the vehicle braking system includes four wheel cylinders 30) connected to the secondary braking unit 24. In some embodiments, the primary braking unit 22 is a single unit including inlet/outlet ports (e.g., ports 70, 90) for connection to, for example, the secondary braking unit 24, the master cylinder 32, and the reservoir 26. In alternative embodiments, for example as shown in FIG. 6, the master cylinder 32 and reservoir 26 may be incorporated into the primary braking unit 22.

The master cylinder 32 is in a direct relationship with the brake pedal 28 via an input rod 28A such that the brake pedal 28 actuates the master cylinder 32 directly through the input rod 28A. The master cylinder 32 is a tandem master cylinder with two master cylinder pistons 32A, 32B biased to unactuated positions by master cylinder springs 32C, 32D, 32E, as described in greater detail with respect to FIG. 2. The vehicle braking system 20 further includes two separate braking circuit, a first braking circuit 10 and a second braking circuit 12. Each braking circuit 10, 12 extends from a chamber 32F, 32G associated with one of the master cylinder pistons 32A, 32B, through the primary braking unit 22, and into and through the secondary braking unit 24 to two of the four wheel cylinders 30.

The primary braking unit 22 further includes an electronically controlled pressure generating unit 34 operable to increase the fluid output from the primary braking unit 22 to the wheel cylinders 30 in a brake-by-wire mode of operation. As shown, the electronically controlled pressure generating unit 34 is a plunger 36 driven by an electric motor 38 to pressurize the primary braking unit 22 and the wheel cylinders 30. Control valves 34A are configured to transition between an open position and a closed position and are operable to selectively separate the outlet of the plunger 36 from the wheel cylinders 30 in the closed position. The master cylinder 32 and electronically controlled pressure generating unit 34 are two fluid pressure suppliers. The vehicle braking system 20 includes a third fluid pressure supplier, motor-driven pumps, which will be explained in greater detail below.

Figure 2:
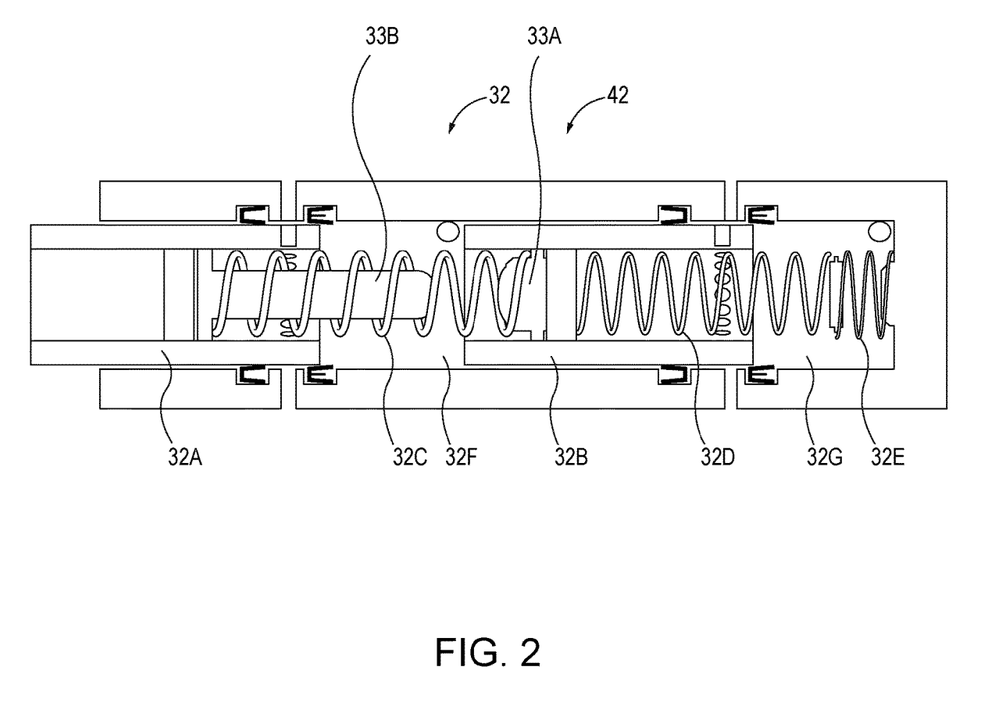
FIG. 2 is a schematic representation of the integrated pedal feel simulator of the brake system shown in FIG. 1.

As shown in FIG. 2, the primary braking unit 22 further includes a pedal feel simulator 42 that is incorporated into the master cylinder 32. The arrangement of springs 32C, 32D, 32E positioned within the master cylinder simulates varied feedback to the brake pedal to mimic the feedback a user would expect in a direct braking action. In some embodiments, the integrated pedal feel simulator 42 relays feedback to the brake pedal 28 proportional to the force supplied by the user to the brake pedal 28. The pedal feel simulator 42 creates a reaction force at the brake pedal 28 based on the motion of the master cylinder plungers 32A, 32B against the biases of the springs 32C, 32D, 32E. Each of the springs 32C, 32D, 32E compresses at a rate based on a fixed characteristic (i.e., the spring constant of the respective spring 32C, 32D, 32E). Each of the springs 32C, 32D, 32E can differ from one another (e.g., spring diameter, wire diameter, pitch) to have different spring constants. For example, spring 32E has a smaller wire diameter than spring 32D, which has a smaller wire diameter than spring 32C. In this way, spring 32E will compress first until the force to compress spring 32E surpasses the force required to compress spring 32D, which will compress until the force to compress spring 32D surpasses the force required to compress spring 32C, which will then compress. In this way, a more natural and varied pedal feel is generated via the pedal feel simulator 42 integrated into the master cylinder 32. The force-feedback gets firmer the more that the pedal 28 is pressed. It is also noted that the biasing members in the master cylinder 32 are not limited to springs, coil springs or otherwise. For example, the master cylinder 32 illustrated in FIG. 2 also includes another biasing member in the form of an elastic pad or disc 33A. The elastic pad 33A is fixed to the second master cylinder piston 32B and arranged for selective contact by a portion of the first master cylinder piston 32A or a rod 33B secured thereto, the rod 33B having a rigid structure. For example, a distal end of the rod 33B may come into contact with the elastic pad 33A upon a sufficient amount of deflection in the spring 32C between the pistons 32A, 32B. According to this embodiment, not only are multiple biasing members used to generate the brake pedal reaction force, but also multiple diverse types of biasing members, some of which act concurrently. Other variations are also contemplated, such as switching the placement of the elastic pad 33A and the rod 33B or using two abutting elastic pads. Additional details regarding pedal feel simulators incorporated into master cylinders are disclosed in German Patent Application DE 10 2020 202 716 A1, to Robert Bosch, GmbH, 70469 Stuttgart, DE the entire contents of which are incorporated herein by reference.

In the standard brake-by-wire mode of operation, there is a direct relationship between the stroke input (i.e., travel distance, offset distance) to the brake pedal 28 (and therefore also the stroke input to the input rod 28A and master cylinder pistons 32A, 32B) and the input force required to move the brake pedal 28 by that distance. There is also therefore a predetermined relationship relating the stroke input or travel distance of the brake pedal 28 to the reaction or feedback force provided by the pedal feel simulator 42. The pedal simulator 42 provides feedback to the brake pedal 28 according to a fixed characteristic of the pedal feel simulator 42. More specifically, when the user moves the brake pedal 28 a first distance (e.g., the displacement of the input rod 28A as measured by a pedal input sensor), the master cylinder piston 32A translates a corresponding distance as a function of the first distance and the spring constants of the springs 32C, 32D, 32E of the integrated pedal feel simulator 42. The associated feedback forces are dependent upon the spring constant (i.e., the fixed characteristic) of the spring 32C, 32D, 32E and the pressure applied by the user at the brake pedal 28.

With continued reference to FIG. 1, the primary braking unit 22 further includes a plurality of valves arranged to control fluid flow within the primary braking unit 22. Separation valves 48 associated with each circuit 10, 12 separate the master cylinder 32 from the secondary braking unit 24 and the wheel cylinders 30. Additionally, a separation valve 58 is located within the first brake circuit 10 between the first master cylinder chamber 32F and a collector 62. In some embodiments, the collector 62 is the reservoir 26, though in other embodiments, as shown in FIG. 1, the collector 62 is a separate reservoir 26 for holding fluid at ambient pressure. As shown in FIG. 1, the reservoir 26 is a component of the brake operating unit while the collector 62 is incorporated into the primary braking unit 22. In some embodiments, a fluid path extends between the collector 62 and the reservoir 26. One-way valves 68 are located within the primary braking unit 22 and connect the collector 62 and the reservoir 26 to the secondary braking unit 24, thereby allowing the secondary braking unit 24 to draw fluid from the collector 62 and the reservoir 26.

The secondary braking unit 24 includes a second electronically controlled pressure generating unit, a motor-driven pump 50. The second pressure generating unit 50 includes a motor 52 operable to drive a plurality of pumps 54, 56. Each pump 54, 56 has an outlet side coupled to pressurize two of the wheel cylinders 30 (e.g., the first pump 54 pressurizes the front wheel cylinders 30 and the second pump 56 pressurizes the rear wheel cylinders 30). Alternatively, the first pump 54 may pressurize the front left wheel cylinder 30 and the rear right wheel cylinder 30 and the second pump 56 may pressurize the front right wheel cylinder 30 and the rear left wheel cylinder. Fluid for the pumps 54, 56 is drawn from an accumulator 60. Alternatively, each pump 54, 56 may draw fluid from the reservoir 26 or collector 62 through a high-pressure selector valve 66.

The secondary braking unit 24 shown in FIG. 1 includes four inlet valves 44 and four outlet valves 46, one of each valve 44, 46 associated with each of the wheel cylinders 30. Each inlet valve 44 is located between a respective wheel cylinder 30 and the fluid pressure suppliers. Each outlet valve 46 is located between the respective wheel cylinder 30 and one or both of the accumulator 60 and the reservoir 26. The inlet valves 44 are normally open control valves and the outlet valves 46 are normally closed control valves. The inlet and outlet valves 44, 46 are selectively manipulated (opened and closed to varying degrees via feedback from sensors, etc.) to control aspects of braking such as an anti-lock braking system (ABS), traction control, or an electronic stability program (ESP).

An inlet valve 64 is located in parallel with each selector valve 66. The inlet valves 64 are electronically controllable to maintain or modify a pressure differential across the inlet valves 64 by transitioning between a closed position and an open position (i.e., pulsation), and are operable to maintain a plurality of open positions therebetween (i.e., differential pressure control). When in an open position, each inlet valve 64 provides a fluid path from the primary braking unit 22 to an inlet valve 44.

The secondary braking unit 24 includes two accumulators 60, one associated with each of the first and second braking circuits 10, 12. Each accumulator 60 is configured to selectively receive and store fluid the outlet valves 46 associated with the respective circuit 10, 12. Each accumulator 60 may be configured to store the fluid until electrically controlled to release or return the fluid to the respective pump 54, 56, or to the reservoir 26.

Each of the primary and secondary braking units 22, 24 includes a separate power source 92, 94. The primary braking unit 22 includes a first power source 92 such as a first battery. The second braking unit 24 includes a second power source 94 separate from the first power source 92, such as a second battery. As such, power loss in the primary braking unit 22 does not affect the power source 94 in the secondary braking unit 24 and, similarly, power loss in the secondary braking unit 24 does not affect the power source 92 in the primary braking unit 22. Therefore, the secondary braking unit 24 (i.e., the motor 52 and pumps 54, 56) function as a back-up unit upon power loss in the primary braking unit 22.

The braking system 20 further includes a controller 80. The controller 80 may include a number of individual control units that function separately from one another. The controller 80 is programmed to receive signals from various sensors of the braking system 20. These sensors may include, for example, pressure sensors within the first and/or second circuits 10, 12 and pedal input sensors (e.g., pedal travel sensor, pedal pressure/force sensor, etc.) operable to measure an input to the brake pedal 28. The controller 80 is further operable to provide electrical signals to various components of the braking system 20 to actuate, for example, the motor 38 of the first electronically controlled pressure generating unit 34, the motor 52 of the second electronically controlled pressure generating unit 50, and the various valves 34A, 44, 46, 48, 58, 64, 66.

The braking system 20 is operable in three modes: a standard brake-by-wire mode, a first back-up mode, and a second back-up mode. In the standard brake-by-wire mode, a user provides an input to the brake pedal 28, displacing the master cylinder pistons 32A, 32B, and thereby displacing fluid from the master cylinder 32. In response to signals from a sensor (e.g., the pressure sensor, the pedal input sensor, etc.), the motor 38 of the electronically controlled pressure generating unit 34 is actuated to exert a drive force on the plunger 36, thereby pressurizing brake fluid to provide a braking force at the wheel cylinders 30. If anti-lock braking, traction control, or stability control are needed, the inlet and outlet valves 44, 46 are manipulated via the controller 80 to provide the requested control. The separation valves 48 are closed, thereby prohibiting fluid from the master cylinder 32 from directly influencing the wheel cylinders 30. The integrated pedal feel simulator 42 is in communication with the brake pedal 28 to provide feedback to the operator.

The first back-up mode is utilized when the operator provides an input to the brake pedal 28 and the first electronically controlled pressure generating unit 34 is incapable of providing a corresponding volume of fluid to the wheel cylinders 30. Such a scenario may occur, for example, if a sensor provides a signal outside of a predetermined range, or if the motor 38 is incapable of activating the plunger 36. Alternatively, the back-up mode may be utilized when there is no operator input (e.g., in automated braking, collision avoidance, etc.).

In a scenario in which the first back-up mode is triggered by the electronically-controlled pressure generating unit 34 being inoperable to provide the desired braking pressure at the wheel cylinders 30, the master cylinder remains disconnected from the wheel cylinders 30 via the separation valves 48. In response to signals from a sensor (e.g., the pressure sensor, the pedal input sensor, etc.), the motor 52 runs the pumps 54, 56 of the secondary braking unit 24 to draw fluid from the accumulators 60 (or alternatively from the collector 62 via the valve 66), moving the fluid through open inlet valves 44 and to the wheel cylinders 30. The control valves 34A are in the unactuated (i.e., biased) closed position as the first electronically controlled pressure generating unit 34 is not in use.

In the event that, during the occurrence of the first back-up mode, the second electronically controlled pressure generating unit 50 is incapable of providing an adequate braking force to the wheel cylinders 30, the controller 80 opens the separation valves 48 to establish a fluid path directly from the master cylinder 32 to provide a braking force at the wheel cylinders 30 through the separation valves 48 in a push-through back-up mode.

Figure 3:
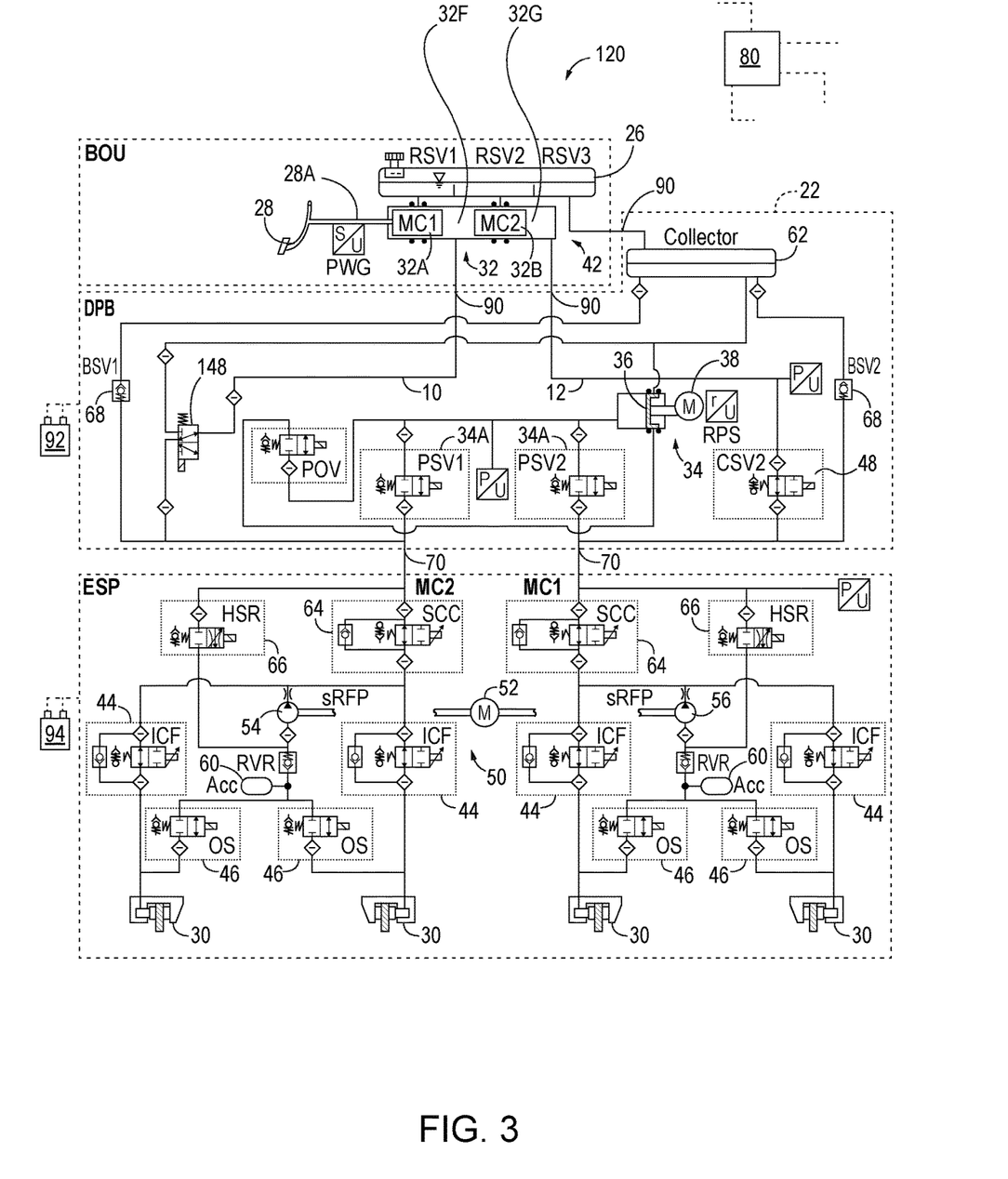
FIG. 3 is a schematic diagram of a brake system having an integrated pedal feel simulator according to a second embodiment.

FIG. 3 illustrates a vehicle braking system 120, similar to the vehicle braking system 20 illustrated in FIG. 1, except as otherwise described. The vehicle braking system 120 omits the separation valve 48 in the first braking circuit 10 that separates the master cylinder 32 from the wheel cylinders 30 and the separation valve 58 in the first braking circuit 10 that separates the master cylinder 32 from the collector 30. Instead, a switching valve 148 is located within the first braking circuit 10. The switching valve 148 is a two-way switching valve capable of switching between a first position and a second position. In the first position, the switching valve 148 couples (i.e., provides a fluid path through the valve 148 between) the master cylinder 32 (and more specifically the first master cylinder chamber 32F) to the collector 62. In the second position, the switching valve 148 couples the master cylinder 32 to the wheel cylinders 30. In some embodiments, the switching valve 148 is biased to the second position such that a power failure in the primary braking unit 22 results in an open fluid path from the master cylinder 32 to the secondary braking unit 24. In the primary mode of operation, the switching valve 148 is in the first position, directing fluid from the first master cylinder chamber 32F through the switching valve 148 and to the collector 62. This is a loop at atmospheric pressure between the first master cylinder chamber 32F and the reservoirs 26, 62, functioning as a recirculation mode. In this way, fluid can leave the master cylinder chamber 32F, allowing the spring 32C to compress and provide feedback to the user. The fluid from the master cylinder chamber 32F is directed through the switching valve 148 to the collector 62 and not to the wheel cylinders 30, as the system is functioning as a brake-by-wire system in the primary mode of operation.

In the first back-up mode of operation, the switching valve 148 may be energized to the first position or may otherwise be biased to the second position if there is power loss in the primary braking unit 22. If the switching valve 148 remains in the first position, the system functions as described above with respect to the primary mode of operation, though the motor 52 and pumps 54, 56 provide braking at the wheel cylinders rather than the electronically-controlled pressure generating unit 34. If the switching valve 148 is biased to the second position in the first back-up mode of operation, the fluid from the master cylinder chamber 32F may be drawn via the pump 54 through an open high-pressure selector valve 66 in some embodiments. If energized (i.e., if no power failure in the primary braking unit 22), the separation valve 48 in the second circuit 12 may be closed in the first back-up mode of operation.

In the second back-up mode of operation, the switching valve 148 is in the second position, coupling the master cylinder 32 to the wheel cylinders 30 in a push-through mode of operation where the pressure applied by the user at the brake pedal 28 is transferred to the wheel cylinders 30. In the second back-up mode of operation, the separation valve 48 located within the second braking circuit 12 is likewise open to allow push-through braking to the wheel cylinders 30 in the second braking circuit 12.

Figure 4:
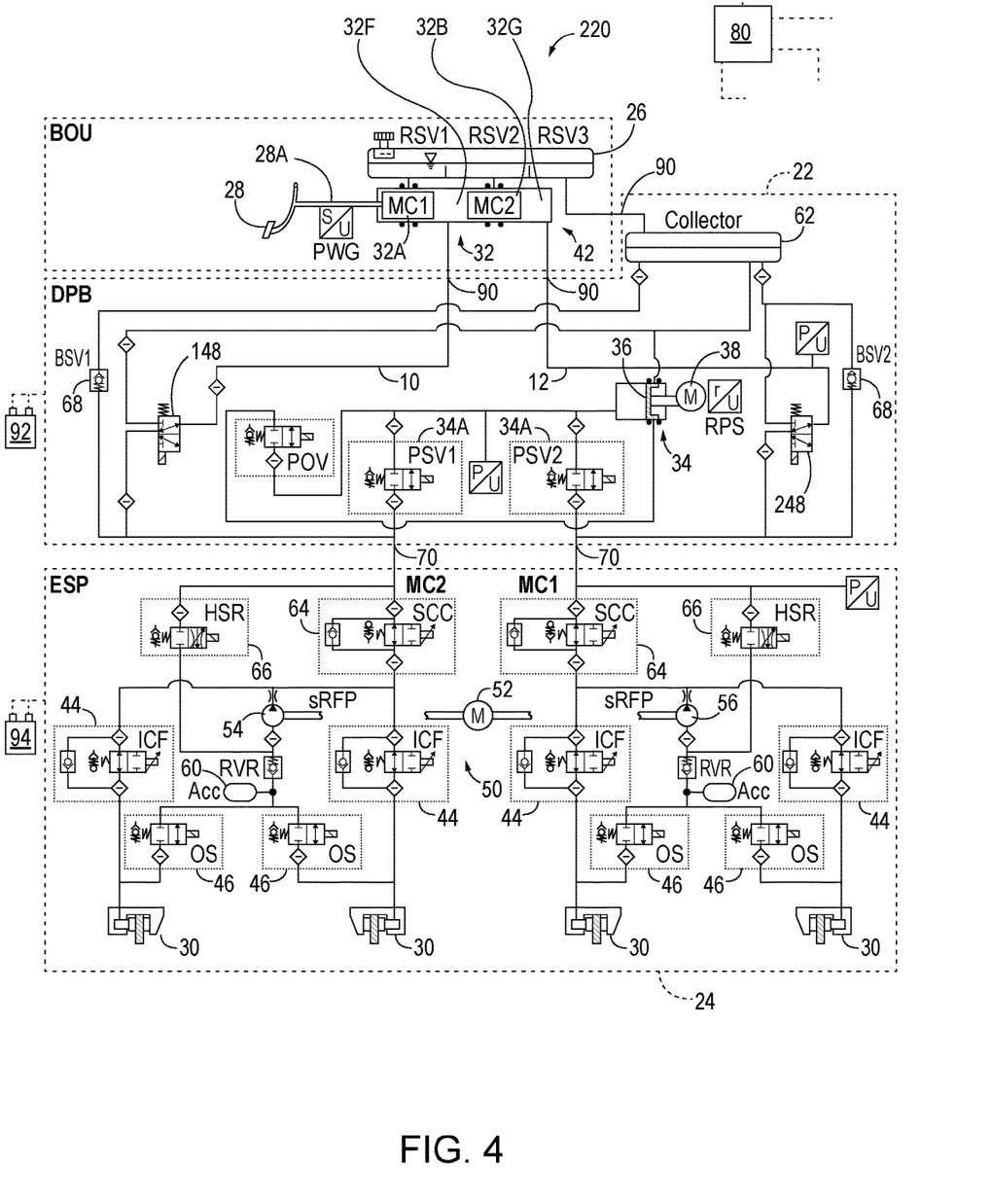
FIG. 4 is a schematic diagram of a brake system having an integrated pedal feel simulator according to a third embodiment.

FIG. 4 illustrates a vehicle braking system 220, similar to the vehicle braking system 120 illustrated in FIG. 3, except as otherwise described. The vehicle braking system 220 incorporates the switching valve 148 in the first braking circuit 10 and further replaces the separation valve 48 in the second braking circuit 12 with a switching valve 248, similar to the switching valve 148. Introducing the switching valve 248 additionally introduces a new fluid path between the master cylinder 32 (specifically the second master cylinder chamber 32G) and the collector 62 not otherwise included in the vehicle braking systems 20, 120 shown in FIGS. 1 and 3, respectively.

Similar to the switch valve 148, the switching valve 248 is a two-way switching valve capable of switching between a first position and a second position. In the first position, the switching valve 248 couples (i.e., provides a fluid path through the valve 248 between) the master cylinder 32 (and more specifically the second master cylinder chamber 32G) to the collector 62. In the second position, the switching valve 248 couples the master cylinder 32 to the wheel cylinders 30. In some embodiments, the switching valve 248 is biased to the second position such that a power failure in the primary braking unit 22 results in an open fluid path from the master cylinder 32 to the secondary braking unit 24. In the primary mode of operation, the switching valve 148 operates as described with respect to FIG. 3, directing fluid from the first master cylinder chamber 32F through the switching valve 148 and to the collector 62. At the same time, the second switching valve 248 can also be open. In this way, fluid can also leave the second master cylinder chamber 32G, allowing the springs 32D, 32E to compress and provide feedback to the user. The fluid from the second master cylinder chamber 32G is directed through the switching valve 248 to the collector 62 and not to the wheel cylinders 30, as the system is functioning as a brake-by-wire system in the primary mode of operation.

In the braking system 120 shown in FIG. 3, only the first braking circuit 10 is configured to direct fluid to the collector 62 upon a braking input at the brake pedal 28 in the first, brake-by-wire mode of operation. As such, the second master cylinder piston 32B is unable to displace fluid from within the second master cylinder chamber 32G. This limits the range of the brake pedal 28, the total travel of the master cylinder 32, and the total volume of fluid that can be displaced from the master cylinder 32 in the primary mode of operation. In contrast, in the braking system 220 shown in FIG. 4, both of the first and second braking circuits 10, 12 are configured to direct fluid from their respective master cylinder chambers 32F, 32G to the collector 62 via the valves 148, 248 in the first, brake-by-wire mode of operation.

The switching valve 248 functions similar to the switching valve 148 in the second and third modes of operation, as described above with respect to FIG. 3.

Figure 5:
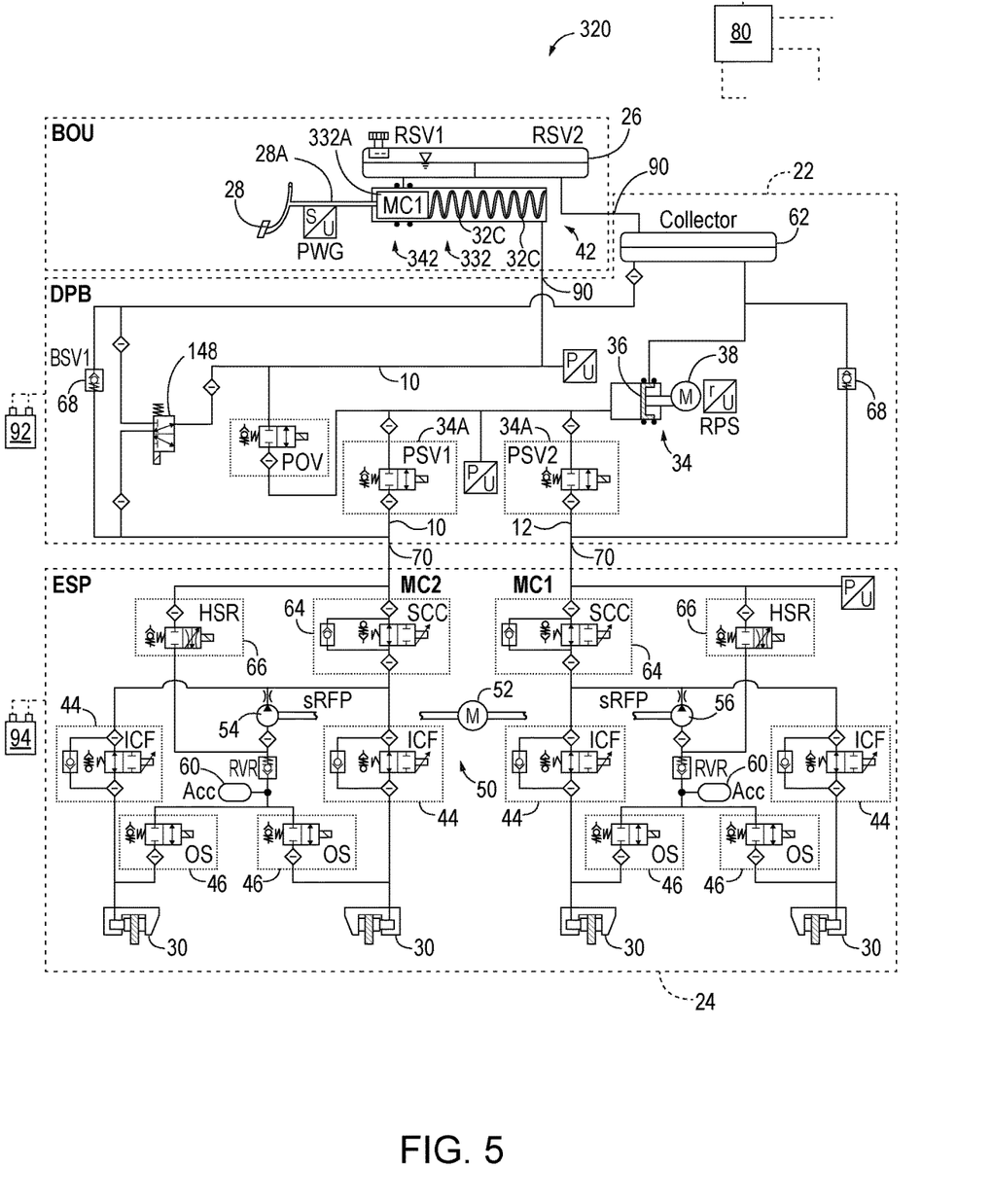
FIG. 5 a schematic diagram of a brake system having an integrated pedal feel simulator according to a fourth embodiment.

FIG. 5 illustrates a vehicle braking system 320, similar to the vehicle braking system 120 illustrated in FIG. 3, except as otherwise described. The vehicle braking system 220 incorporates a more traditional single-piston pedal feel simulator 342 in place of the master cylinder 32 with an integrated pedal feel simulator 42 shown in FIGS. 1-4. In the vehicle braking system 320, the pedal feel simulator 342 functions as the master cylinder 332 and is in a direct relationship with the brake pedal 28 via an input rod 28A such that the brake pedal 28 actuates the piston 332A of the pedal feel simulator 342 directly through the input rod 28A. The piston 332A is biased to an unactuated position by one or more springs 32C, 32D. The arrangement of springs 32C, 32D positioned within the master cylinder simulates feedback to the brake pedal to mimic the feedback a user would expect in a direct braking action.

As the pedal feel simulator 342 includes only a single piston 332A and associated piston chamber, the pedal feel simulator piston 332A has an increased range relative to the braking systems 20, 120 shown in FIGS. 1 and 3, as the piston 332A is movable through the entire chamber (until total compression of the springs 32C, 32D). From the singular output of the master cylinder 332, the entire primary braking system 22 may not be divided into separate circuits, and in some constructs, can be considered to be part of the first braking circuit 10, from the master cylinder 332 (and pedal feel simulator 342) up to the control valves 34A. Push-through braking in the second back-up mode of operation is limited to the first braking circuit 10, though braking in the first and second modes of operation remains similar as described above with respect to vehicle braking systems 20, 120 shown in FIGS. 1 and 3. Notably, though the second braking circuit 12 lacks its own connection to the pedal feel simulator 342, the downstream portion of the primary braking system 22 is divided by the control valves 34A into the first and second braking circuits 10, 12 that receive fluid from the electronically-controlled pressure generating unit 34 in a similar manner to that described above with respect to vehicle braking systems 20 and 120. Additionally, the secondary braking system 24 is identical in arrangement and function to the secondary braking systems 24 shown and described with respect to FIGS. 1, 3, and 4.

FIG. 6 illustrates a vehicle braking system 420, similar to the vehicle braking system 320 illustrated in FIG. 5, except as otherwise described. Rather than having a brake operating unit (brake pedal 28, input rod 28A, master cylinder 32, incorporated pedal feel simulator 42, and reservoir 28) and a separate primary braking unit 22, the braking system 420 shown in FIG. 6 incorporates the brake operating unit into the primary braking unit 22 as a single box unit. In this arrangement, the separate collector 62 is omitted and the switching valve 148, when in the first position, directs fluid directly to the reservoir 26.

Although some aspects have been described in detail with reference to certain preferred embodiments, variations and modifications exist within the scope and spirit of one or more independent aspects as described. Various features and advantages of the invention are set forth in the following claims.

What is claimed is:

1. A vehicle braking system comprising:
    a master cylinder having a pedal feel simulator incorporated therein;
    a reservoir configured to retain a volume of unpressurized brake fluid for use in the vehicle braking system;
    a wheel cylinder coupled to the master cylinder via a first braking circuit;
    an electronically-controlled pressure generating unit configured to move fluid through the first braking circuit to the wheel cylinder in a first mode of operation; and
    a two-way valve positioned in the first braking circuit and configured to selectively decouple the master cylinder from the wheel cylinder,
    wherein, in the first mode of operation, the master cylinder is decoupled from the wheel cylinder via the two-way valve and the master cylinder is coupled to the reservoir via the two-way valve, and
    wherein, in a second mode of operation, the master cylinder is coupled to the wheel cylinder via the two-way valve;
    the vehicle braking system further comprising a motor-driven pump separate from the electronically-controlled pressure generating unit and configured to move fluid through the first braking circuit to the wheel cylinder in a third mode of operation.

2. The vehicle braking system of claim 1, wherein the wheel cylinder is a first wheel cylinder and the two-way valve is a first two-way valve, the vehicle braking system further comprising a second wheel cylinder coupled to the master cylinder via a second braking circuit, and a second two-way valve positioned in the second braking circuit and configured to selectively decouple the master cylinder from the second wheel cylinder.

3. The vehicle braking system of claim 2, wherein, in the first mode of operation, the master cylinder is decoupled from the second wheel cylinder via the second two-way valve and the master cylinder is coupled to the reservoir via the second two-way valve and wherein, in the second mode of operation, the master cylinder is coupled to the second wheel cylinder via the two-way valve.

4. The vehicle braking system of claim 2, wherein the electronically-controlled pressure generating unit is configured to move fluid through the second braking circuit to the wheel cylinder in the first mode of operation.

5. The vehicle braking system of claim 1, wherein the electronically-controlled pressure generating unit is powered by a first power supply, and wherein the motor-driven pump is powered by a second power supply separate from the first power supply.

6. The vehicle braking system of claim 1, wherein the master cylinder includes a first master cylinder chamber and a second master cylinder chamber, wherein the first master cylinder chamber is in selective fluid communication with the first braking circuit and the second master cylinder chamber is in selective fluid communication with a second braking circuit.

7. The vehicle braking system of claim 1, wherein the master cylinder includes only a single master cylinder chamber and a single master cylinder piston movable within the master cylinder chamber.

8. A vehicle braking system comprising:
    a master cylinder having a first master cylinder chamber and a second master cylinder chamber and a pedal feel simulator incorporated therein;
    a reservoir configured to retain a volume of unpressurized brake fluid for use in the vehicle braking system;
    a first wheel cylinder coupled to the first master cylinder chamber via a first braking circuit;
    a second wheel cylinder coupled to the second master cylinder chamber via a second braking circuit;
    an electronically-controlled pressure generating unit configured to move fluid through the first braking circuit and the second braking circuit to the first and second wheel cylinders in a first mode of operation;
    a first two-way valve positioned in the first braking circuit and configured to selectively decouple the master cylinder from the first wheel cylinder; and
    a second two-way valve positioned in the second braking circuit and configured to selectively decouple the master cylinder from the second wheel cylinder,
    wherein, in the first mode of operation, the first and second two-way valves decouple the first and second master cylinder chambers from the first and second wheel cylinders, respectively, and couple the first and second master cylinder chambers to the reservoir, and
    wherein, in a second mode of operation, the first and second two-way valves couple the first and second master cylinder chambers to the first and second wheel cylinders, respectively;
    further comprising a motor-driven pump separate from the electronically-controlled pressure generating unit and configured to move fluid through the first braking circuit to the wheel cylinder in a third mode of operation.

9. The vehicle braking system of claim 8, wherein the pedal feel simulator incorporated within the master cylinder includes three biasing members, each of the three biasing members having different spring constants.

10. The vehicle braking system of claim 8, wherein the electronically-controlled pressure generating unit is powered by a first power supply, and wherein the motor-driven pump is powered by a second power supply separate from the first power supply.

11. A vehicle braking system comprising:
    a brake pedal coupled to an input rod;
    a pedal feel simulator having a piston coupled directly to the input rod and configured to provide feedback to an operator of the brake pedal;
    a reservoir configured to retain a volume of unpressurized brake fluid for use in the vehicle braking system;
    a wheel cylinder coupled to the pedal feel cylinder via a first braking circuit;
    a switching valve located within the first braking circuit, wherein, in a first position, the switching valve couples the pedal feel simulator to the reservoir such that an atmospheric loop is established between the pedal feel simulator and the reservoir, and in a second position, the switching valve couples the pedal feel simulator to the wheel cylinder; and an electronically-controlled pressure generating unit configured to move fluid through the first braking circuit to the wheel cylinder in a first mode of operation, wherein, in the first mode of operation, the switching valve is in the first position, and wherein, in a second mode of operation in which the electronically-controlled pressure generating unit is inoperable to move fluid through the first braking circuit, the switching valve is in a second position.

12. The vehicle braking system of claim 11, wherein the wheel cylinder is a first wheel cylinder and the switching valve is a first switching valve, the vehicle braking system further comprising a second wheel cylinder coupled to the pedal feel simulator via a second braking circuit, and a second switching valve positioned in the second braking circuit, wherein, in a first position, the second switching valve couples the pedal feel simulator to the reservoir, and in a second position, the second switching valve couples the pedal feel simulator to the second wheel cylinder.

13. The vehicle braking system of claim 12, wherein, in the first mode of operation, the pedal feel simulator is decoupled from the second wheel cylinder via the second switching valve and the pedal feel simulator is coupled to the reservoir via the second switching valve and wherein, in the second mode of operation, the second pedal feel simulator is coupled to the second wheel cylinder via the switching valve.

14. The vehicle braking system of claim 12, wherein the electronically-controlled pressure generating unit is configured to move fluid through the second braking circuit to the wheel cylinder in the first mode of operation.

15. The vehicle braking system of claim 12, further comprising a motor-driven pump separate from the electronically-controlled pressure generating unit and configured to move fluid through the first braking circuit to the wheel cylinder in a third mode of operation, and wherein the switching valve is in the first position in the third mode of operation.

16. The vehicle braking system of claim 15, wherein the electronically-controlled pressure generating unit is powered by a first power supply, and wherein the motor-driven pump is powered by a second power supply separate from the first power supply.

17. The vehicle braking system of claim 11, wherein the pedal feel simulator includes a first pedal feel simulator chamber and a second pedal feel simulator chamber, wherein the first pedal feel simulator chamber is in selective fluid communication with the first braking circuit and the second pedal feel simulator chamber is in selective fluid communication with a second braking circuit.

18. The vehicle braking system of claim 11, wherein the pedal feel simulator includes only a single pedal feel simulator chamber and the piston is the only piston movable within the pedal feel simulator chamber.

* * * * *